(12) United States Patent
Kleindienst

(10) Patent No.: US 8,767,054 B2
(45) Date of Patent: Jul. 1, 2014

(54) VIEWING SYSTEM FOR THE MANIPULATION OF AN OBJECT

(75) Inventor: Olivier Kleindienst, Nice (FR)

(73) Assignee: KOLPI (FR)

( * ) Notice: Subject to any disclaimer, the term of this patent is extended or adjusted under 35 U.S.C. 154(b) by 1476 days.

(21) Appl. No.: 12/097,440

(22) PCT Filed: Dec. 13, 2006

(86) PCT No.: PCT/FR2006/002716
§ 371 (c)(1),
(2), (4) Date: Oct. 20, 2008

(87) PCT Pub. No.: WO2007/068824
PCT Pub. Date: Jun. 21, 2007

(65) Prior Publication Data
US 2009/0273665 A1   Nov. 5, 2009

(30) Foreign Application Priority Data

Dec. 14, 2005   (FR) ...................................... 05 12676

(51) Int. Cl.
*H04N 13/04* (2006.01)
*H04N 9/47* (2006.01)

(52) U.S. Cl.
USPC ............................................... 348/54; 348/51

(58) Field of Classification Search
USPC .......................................... 348/51, 53, 54, 63
See application file for complete search history.

(56) References Cited

U.S. PATENT DOCUMENTS

| 6,181,768 | B1 * | 1/2001 | Berliner ........................... 378/41 |
| 6,341,869 | B1 * | 1/2002 | Inami et al. ..................... 353/28 |
| 7,589,894 | B2 * | 9/2009 | Christian ....................... 359/462 |
| 2003/0085866 | A1 * | 5/2003 | Bimber et al. ................. 345/156 |
| 2003/0228039 | A1 * | 12/2003 | Green ........................... 382/128 |
| 2005/0285854 | A1 * | 12/2005 | Morita et al. ................. 345/419 |

FOREIGN PATENT DOCUMENTS

WO   WO 0205217 A1 *   1/2002

\* cited by examiner

*Primary Examiner* — Brian J Gillis
(74) *Attorney, Agent, or Firm* — Foley & Lardner LLP; John D. Lanza

(57) ABSTRACT

Viewing device used in the field of stereoscopy to allow a user to manipulate in his close environment a real or virtual object situated a greater or lesser distance from the user. The user can then view the manipulation spaces as well as the real and virtual spaces in the viewing device.

15 Claims, 9 Drawing Sheets

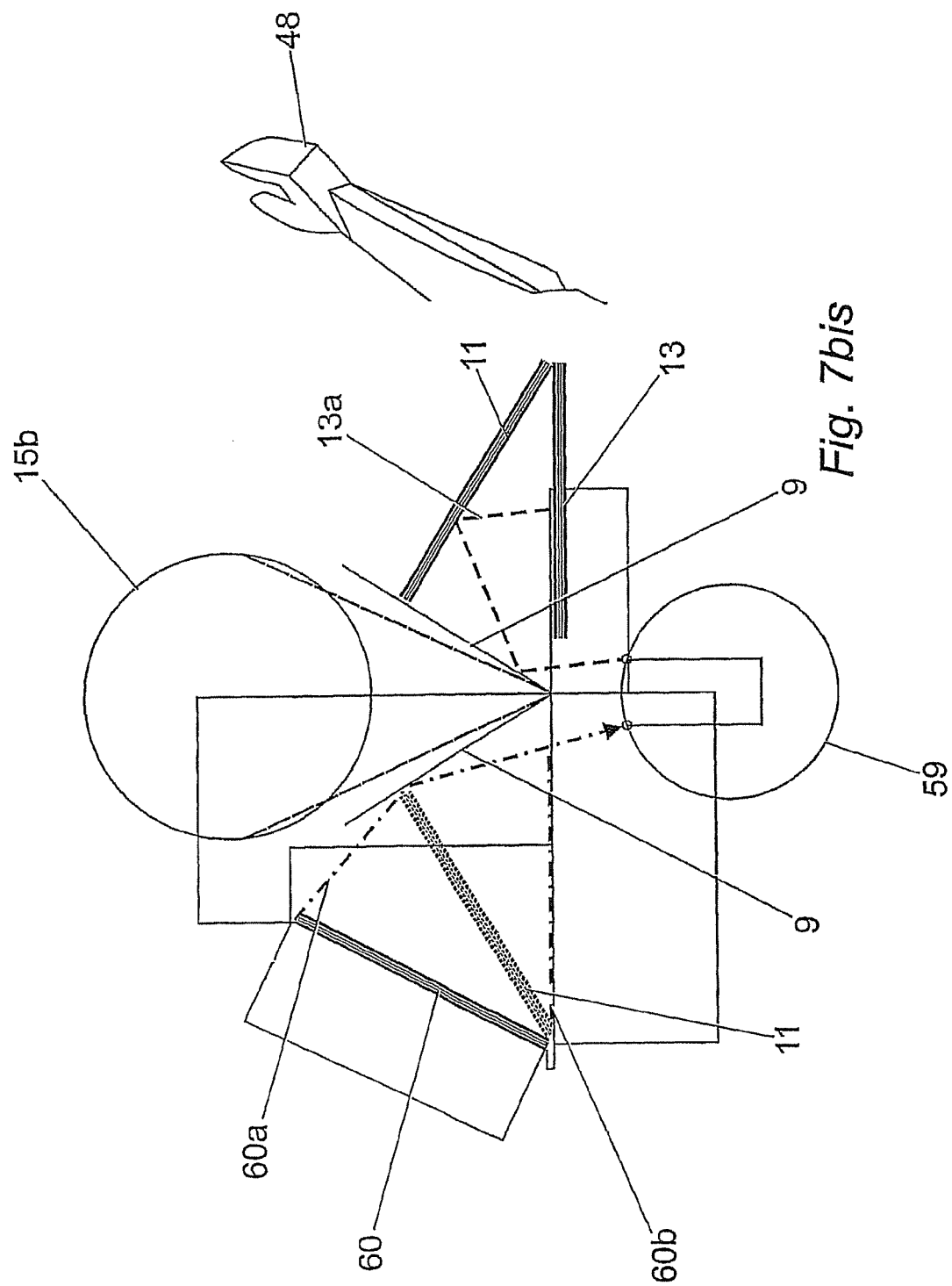
Fig. 7bis

VIEWING SYSTEM FOR THE MANIPULATION OF AN OBJECT

The present invention relates to the field of stereoscopy and more particularly to a method or a system which makes it possible to take action remotely in order to modify the properties of an object.

Stereoscopy is a process which makes it possible to reconstruct a relief sensation from the fusion of two flat images of the same subject. Stereoscopy thus makes possible a 3-dimensional representation from two sources of images. The use of stereoscopy is currently very widespread.

Stereoscopy plays a part in video games in order to show the gaming environment in which the user will play.

Stereoscopy is also used in the field of petroleum exploration in order to locate the deep layers Stereoscopy is a very widely used tool in the field of mechanics relating to design reviews, virtual fluid flows as well as simulation training.

In industry, when a static modelling of a product is completed, one of the first essential needs is to check the proper dynamic functioning. At this stage, the perception of relief and virtual interaction are very important in order to view the product in all possible situations, during its integration within a system which is waiting for this product for example.

Currently, the simulations are carried out more and more by a manipulation of digital models which underlies an increased virtual modelling: collision, force-feedback. The current user interfaces are not sufficiently ergonomic which thus brings about a not insignificant loss of time, which is a substantial disadvantage.

In the medical field, a large number of operations require video and use natural or non-natural channels in order to intervene using instruments. These operations have a field of intervention which is viewed on a monitor. The instruments are interchangeable but always at the end of two intervention pliers.

Currently, students train in such techniques with rare and costly means. For example, they require animal supply facilities. In fact, the training methods do not provide for simulation tools for such interventions. The training sessions are thus limited which is all the more disadvantageous for the students.

As a consequence, an object of the present invention is to provide a system which makes it possible to carry out a precise three-dimensional manipulation, in a volume situated around the user accommodation distance, on an object which is viewed in an apparatus adapted for this purpose. The manipulation space is a volume in spatial coherence with the viewing space.

Another advantage is that the manipulation space is free, i.e. empty. Therefore, the hands or the real and physical sensors-actuators are not viewed on the viewing device. The representation of the hands is thus concealed.

Furthermore, this device is a multi-universe device which can combine real and virtual spaces.

In this device, scale reduction is possible in order to adapt, for example, the manipulation of an object of a real space to the manipulation of an object of a virtual space.

An additional advantage is the large degree of precision of the resolution because the voxel density is greater than ten thousand voxels per cubic centimeter.

Furthermore, the viewing device is compatible with computer applications.

The aims, objects and characteristics of the invention will become more clearly apparent when reading the following description with reference to the drawings in which.

Figure 1:
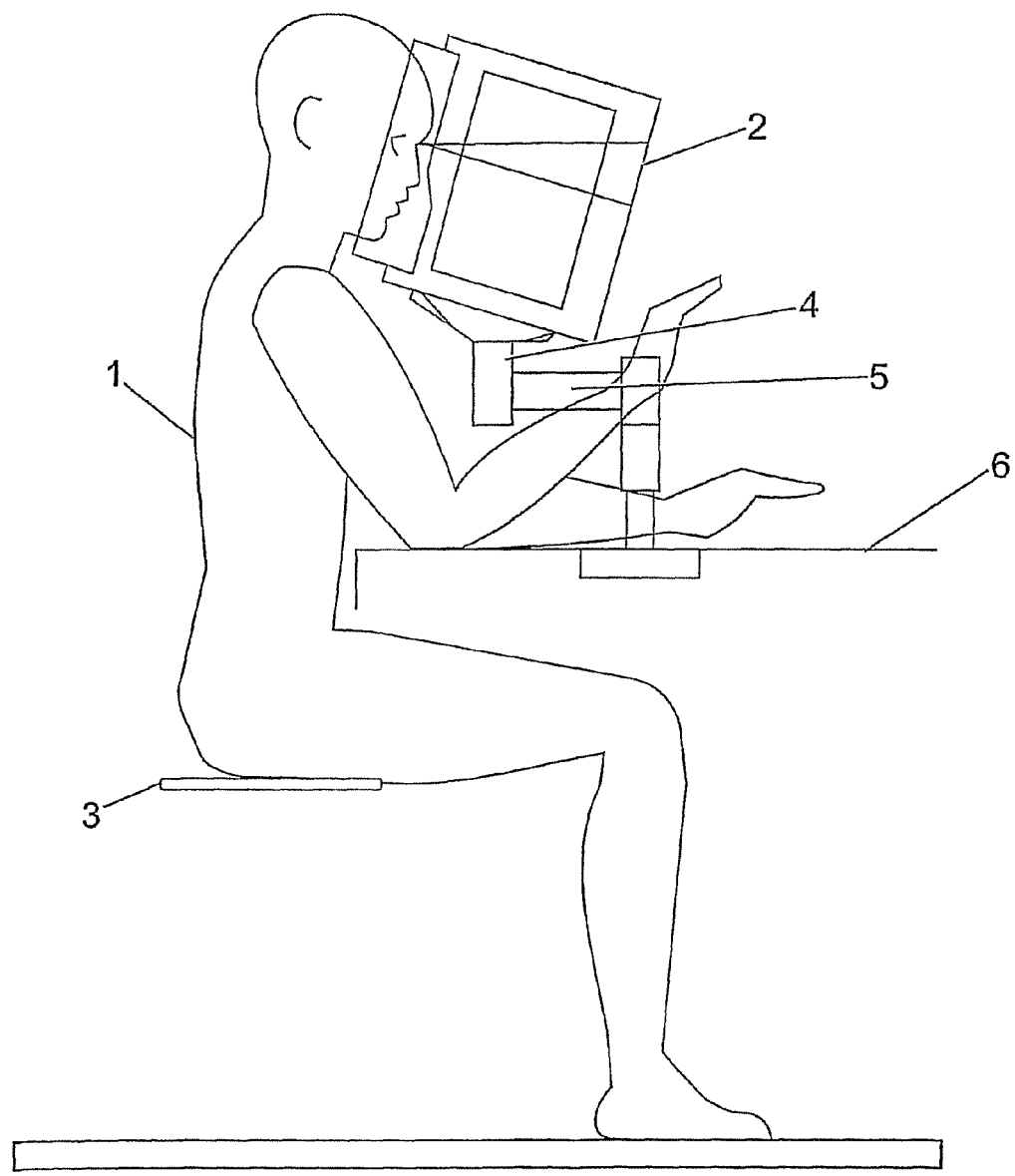
FIG. 1 shows a profile view of a user sitting in front of a viewing device.
Figure 8:
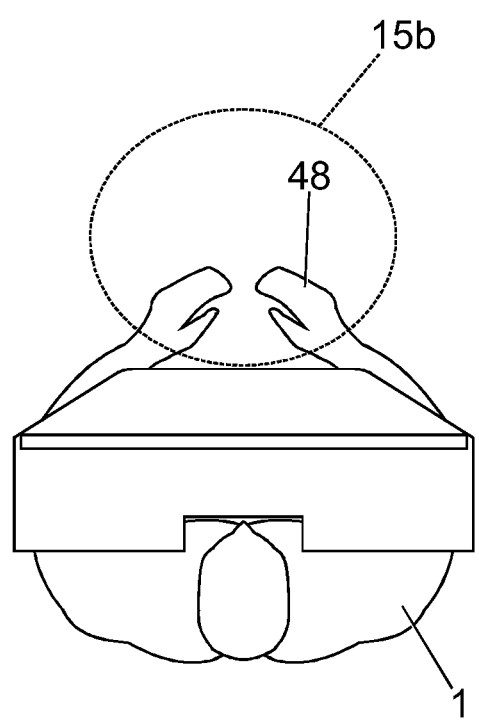
Figure 9:
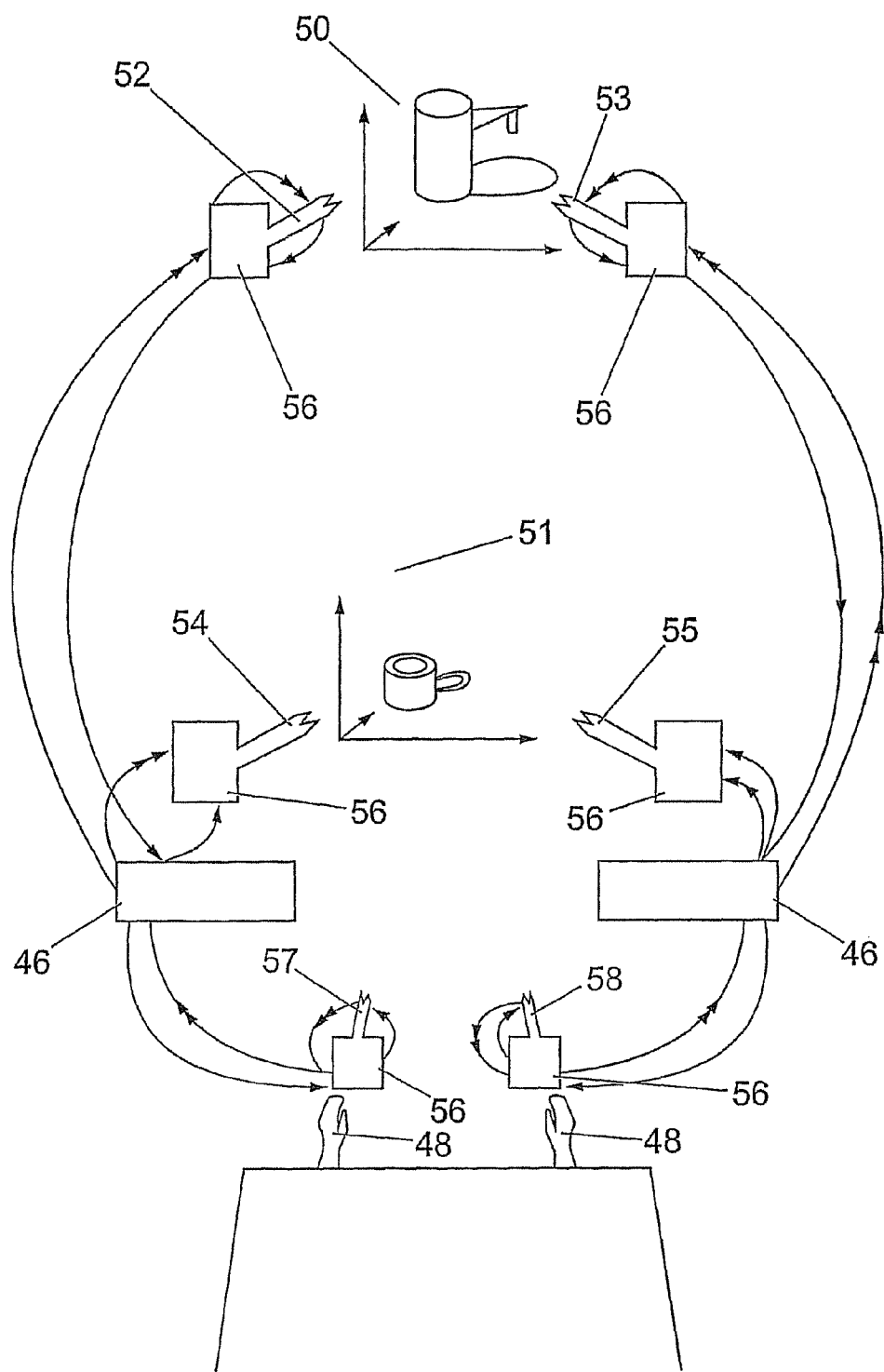

FIG. 7*bis* shows the optical paths in the viewing device;

FIG. 8 shows the top view of FIG. 1;

FIG. 9 shows the haptic process of the manipulation system.

FIG. 1 depicts a user 1 situated in front of the device 2. The user can be sitting on a seat 3 or standing facing the device.

A support 4 is provided under the device. An articulated arm 5 is fixed at one of its ends to this support 4, with the other end of the arm being directly fixed onto a site 6 chosen by the user (table, desk, etc). The fixing of this support thus takes place on the rear part of the device.

Figure 2:
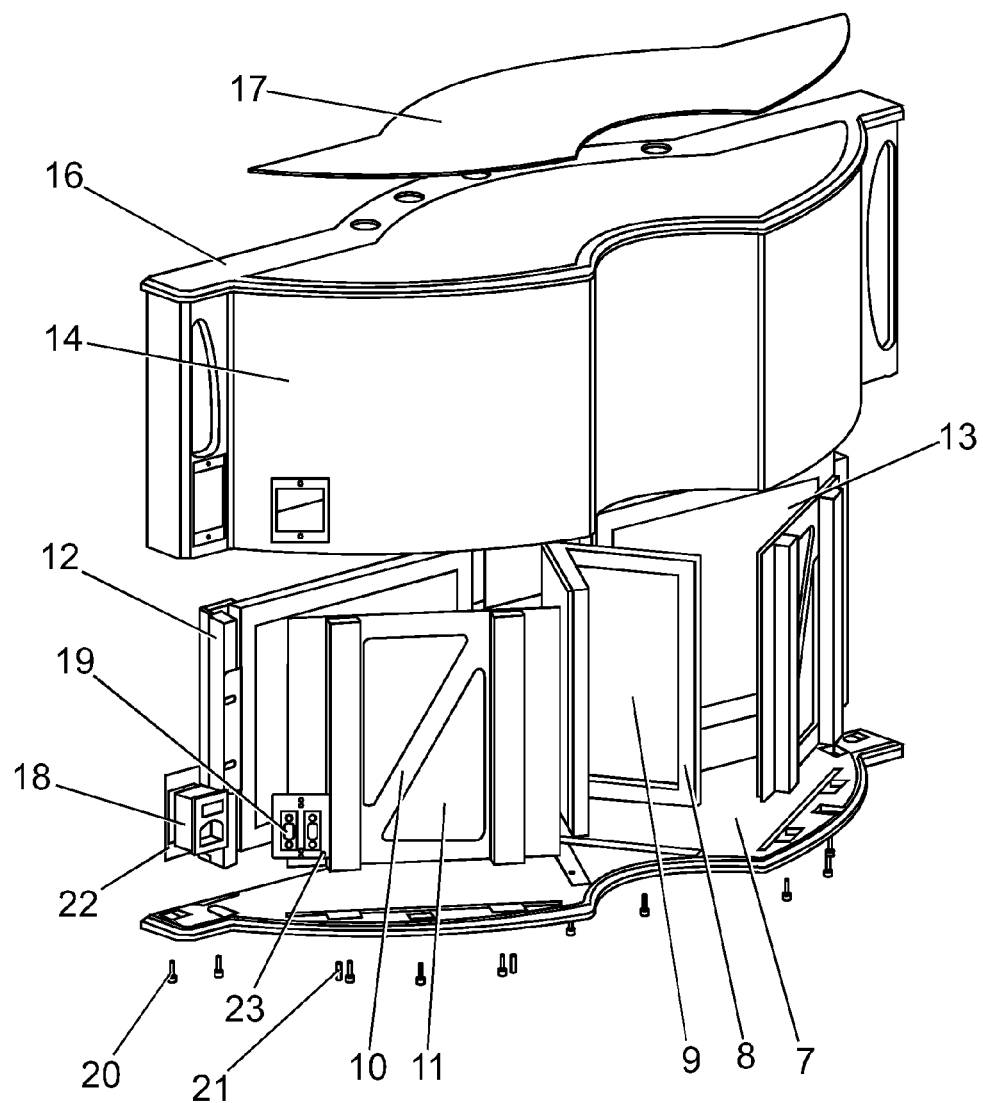
FIG. 2 shows an exploded view of the viewing device, oriented in accordance with its rear face.
Figure 3:
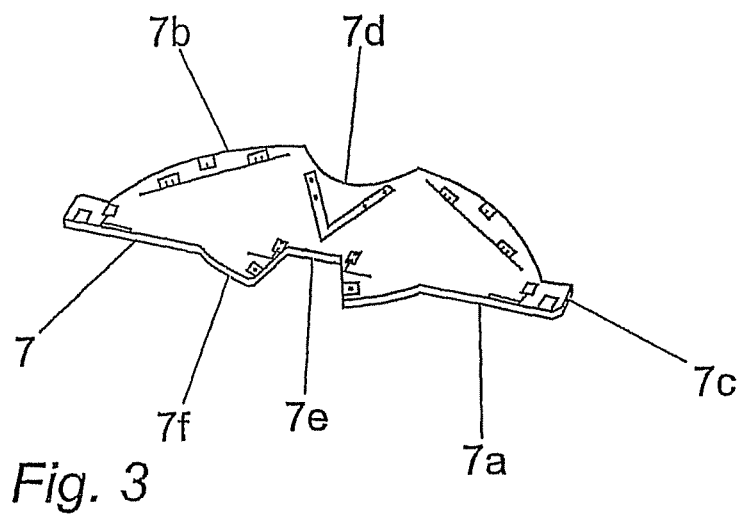
FIG. 3 shows a top view of one of the elements of the viewing device.

As depicted on FIG. 2, this device 2 is firstly made up of a base 7. This base is in the shape of a half-disc (FIG. 3). The straight side 7a of the half-disc is the front part of the base. The rounded side 7b of the half-disc is the rear part of the base. The rear and front part of the base meet, forming a slight rectangular projection 7c at their two ends.

In the middle of the rounded side of this half-disc, the edge of the surface follows a rounded shape 7d which is oriented towards the inside of the half-disc. Facing this rounded shape, a more rectangular shape 7e is carved out in the middle of the straight side of the half-disc. On each side of this rectangular shape, the straight side of the half-disc has a slightly plump shape 7f.

On this half-disc, in FIG. 2, there is located a central support 8. This central support 8 is made up of two rectangular plates linked to one another along their lengths. Each width of these plates is fixed onto the base by means of screws. This central support is fixed to the centre of the half-disc 7, between the rounded shape 7d and the rectangular shape 7e. These plates together form an angle of approximately 45°. The angular opening of the plates is directed towards the rounded shape 7d of the base 7. The plates of this central support 8 each comprise a central mirror 9.

Two lateral supports 10 are also situated on the half-disc. These lateral supports are situated at the two ends of the base 7, on each side of the central support 8. Each lateral support 10 includes two parallelepipeds linked to one another by a z-shaped structure. Each lateral support is oriented at approximately 45 from the straight side 7a of the base towards the interior of this base. Each lateral support also includes a lateral mirror 11. This mirror possesses a reflective index ranging from 0 to 100% reflection. This lateral mirror can be replaced by a screen, a filter or even lenses. The lateral mirror and the parallelepipeds are fixed onto the base 7 by means of screws 20 and slugs 21. At one of the ends of one of the lateral supports 10, at the side of the end of the base 7, two "cinch" connectors 19 are arranged on a video panel 23.

In front of the lateral supports 10 and the central support 8, there is located the screen support 12 of the screen 13. This screen support 12 has a length which is equal to that of the straight part 7a of the base. This screen support 12 is fixed onto the front part of the base by means of screws 20. At one of its ends and at the side of the "cinch connectors" 19, the screen support 12 comprises a "Bulgin"-type switch 18 mounted on one interior plate 22 by means of screws.

Figure 4:
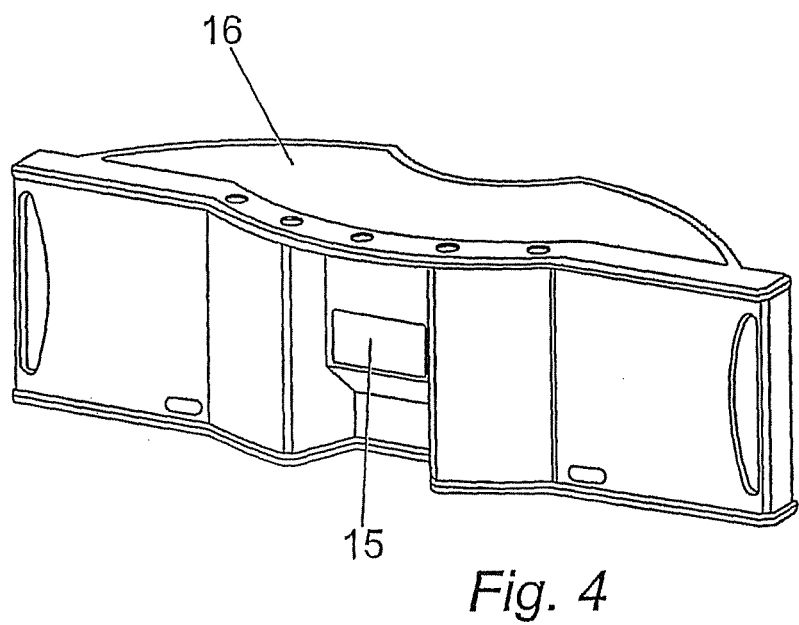
FIG. 4 shows the viewing device oriented in accordance with its front face.

A volume piece following the contours of the base is arranged on the base so as to cover the central support, the lateral supports and the screen support. This volume piece includes a band 14 which constitutes the lateral surface of the volume piece. On the rear part of the device, the band 14 reproduces the cut-out of the rounded form 7*d* of the base. On the end of the band 14, facing the cinch connectors 19, the band has an empty space in order to allow the fitting of the cinch connectors of the lateral support 10. On the front part of the device, the band reproduces the rectangular shape 7*e* of the base. As shown in FIG. 4, at a certain height from the base and vertically aligned with this rectangular cut-out, the band 14 comprises a viewing window 15. This window 15 is thus situated in a sort of recess which the band has on the front part of the device. In the viewing space 15*a*, behind this window, the user can view a superposition of images coming from two differently combined sources, as will be set out hereafter.

The volume piece also comprises a cover 16 shown in FIG. 3. This cover is identical to the half-disc following the base 7. A decoration plate 17 is located on this cover 16.

During its use, the device 2 thus only allows the cover 16, the outer face of the base 7 and the band 14 to appear. On the front part of the device, the band comprises the viewing window 15 which gives access to the viewing space 15*a*. On the rear face of the band 14 there is found the user's work space 15*b*, as we will set out hereafter.

Figure 5:
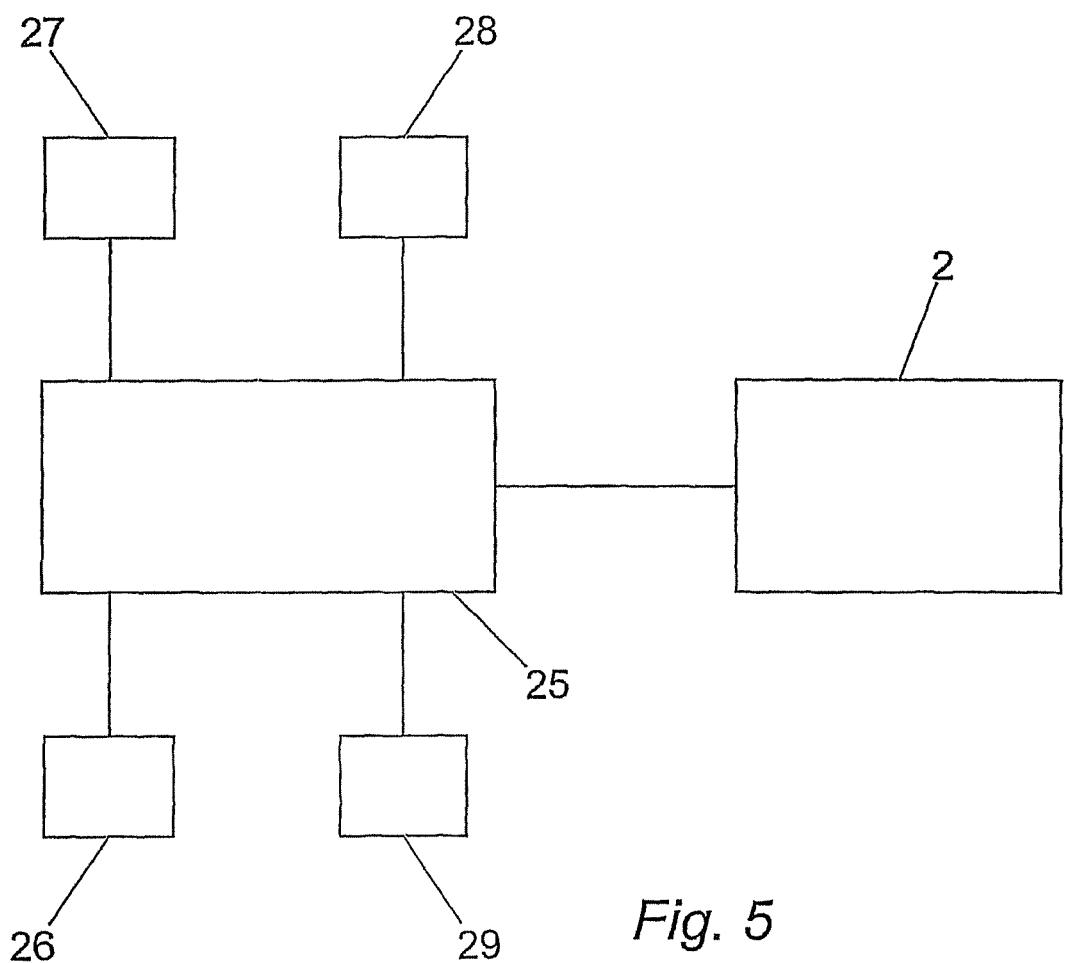
FIG. 5 shows the connection scheme between the viewing device, a computer and different peripherals.
Figure 6:
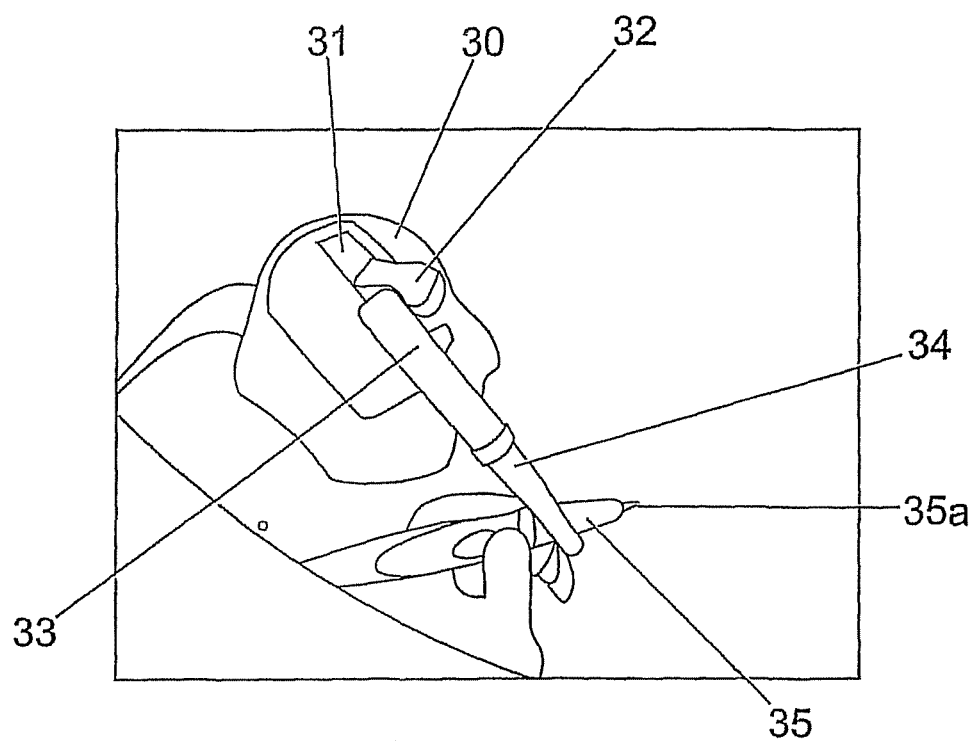
FIG. 6 shows a sensor-actuator manipulated by the user.

As shown in FIG. 5, the device is directly connected to a central electronic unit 25 such as a computer. This computer includes different image processing software as well as graphic or electronic cards. This computer also includes peripherals such as, for example, a keyboard 26, a mouse 28 and a monitor 27. Furthermore, this computer includes a peripheral for the use of the device 2: this is one or several sensors-actuators 29 as shown in FIG. 6. This sensor-actuator 29 is made up of a support base 30 connected to the computer 25. This base 30 includes a slot 31 in which there is arranged a pivoting element 32. This pivoting element has a length of some centimeters. It itself forms a single unit with an elongate element 33 and has a length of approximately ten centimeters. This elongate element has an end 34 in the form of an open forceps. This type of forceps 34 holds the end of an element 35 which resembles a pen. This is a stylet which has six degrees of freedom in the space. This stylet 35 also laterally comprises a small curser 35*a* as will be set out later. The user takes action by manipulating this stylet in the working zone. The element or stylet 35 is also referred to as a sensor-actuator 57, 58 in FIG. 9.

Figure 7:
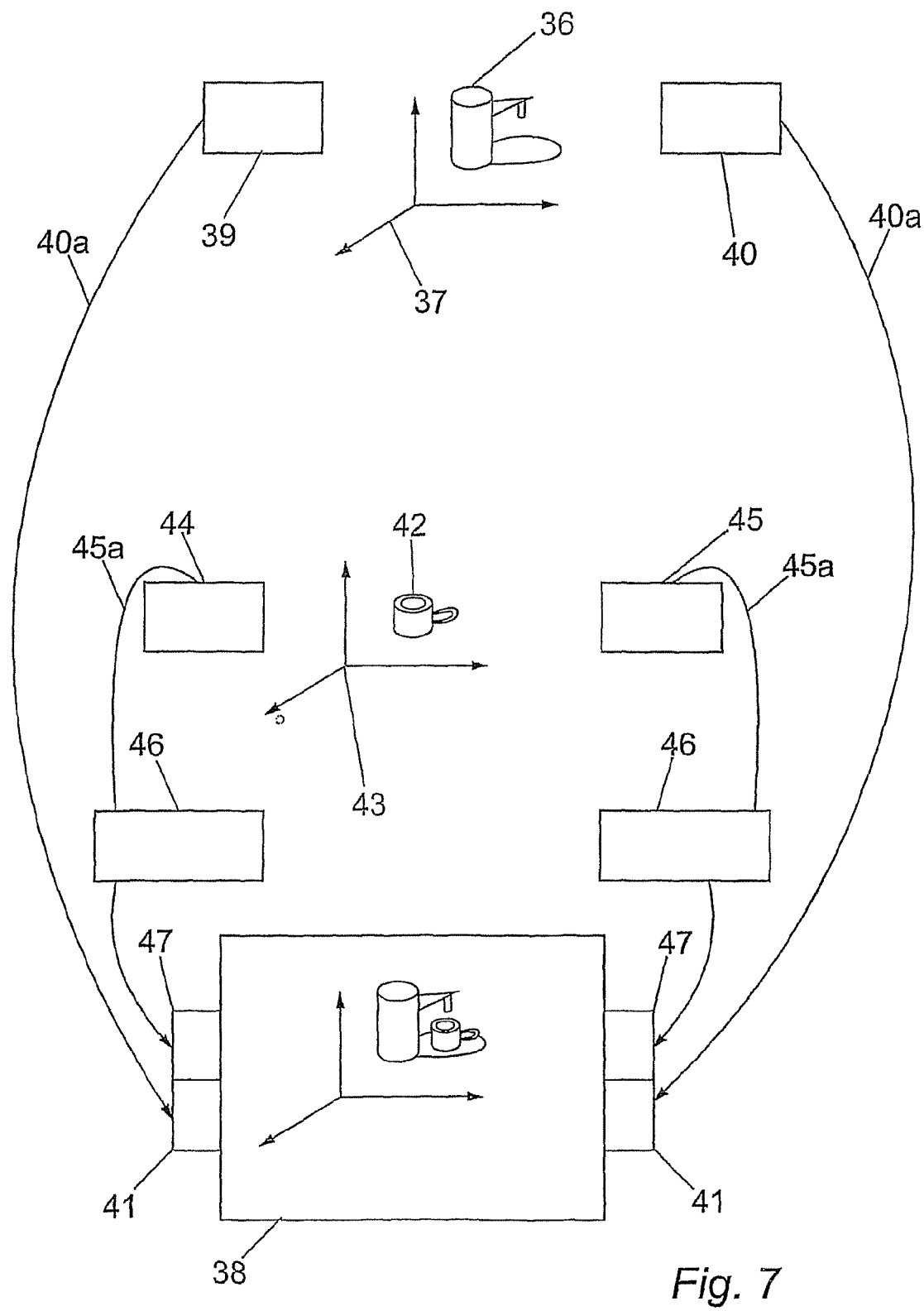
FIG. 7 shows the optical process of the manipulation system.

FIG. 7 (optical) shows the optical mode of operation of the viewing device 2 linked to the computer 25. Taking as an example a real object 36, a coffee machine arranged at a greater or lesser distance from the viewing device 2. This object is situated in an orthonormal real space 37 (xr, yr, zr).

The image of this object is visible in the viewing space 15*a*, in an orthonormal manipulation space 38 (xm, ym, zm). In effect, at least two video image capture systems 39 and 40 situated on either side of the object transmit, by means of a video link 40*a*, the image of the real object 36 directly to the viewing device 2 on the first inputs 41. These image capture systems are, for example, video cameras, magnetic resonance imaging systems or even scanners using lasers.

Following this first real object 36, a second object, for example a virtual object, such as a coffee cup 42 is considered. This object is situated in a virtual orthonormal space 43 (xv, yv, zv). The image of this object is visible in the viewing space 15*a*, in the same orthonormal handling space 38 (xm, ym, zm) as previously. In effect, at least two virtual cameras 44 and 45 situated on either side of the virtual object send the image of the virtual object to the computer 25. This computer processes the images so as to transmit them to the viewing device on the inputs 2 47 via a link 45*a* and application programming interfaces 46.

Depending on the inputs 41 or 47 which receive the images transmitted to the viewing device, these images give rise to different optical processes in the viewing device.

These optical processes are described in FIG. 7*bis* for which all the symmetry of the different mirrors and the screens is not shown.

Thus the rear screen 60 of the viewing device generates two extreme rays 60*a* and 60*b* which correspond to an image coming from the rear of the viewing device. By symmetry of the device, this image is received by the right eye and the left eye of the user on the user's head 59. In the same way, the front screen 13 of the viewing device generates, for example, a middle ray 13*a* which corresponds to an image coming from the front of the viewing device. By means of symmetry of the device, this image is received by the right eye and by the left eye of the user.

At the rear of the viewing device 2, in the work zone or manipulation zone 15*b*, as shown on FIG. 8, the user 1 can manipulate the sensors-actuators 35 using his/her hands 48, without the image of the hands appearing in the viewing space 15*a*.

Thus the viewing device 2 makes it possible to view the superposition of two images, these being real and virtual images. This is therefore a case of augmented virtual reality. The mode of operation (haptic) described in FIG. 9 makes it possible to show the use of the sensors-actuators 57, 58 and shown as element 35 in FIG. 6 and the consequence of this use on the objects viewed as images in the viewing space 15*a*. These sensors-actuators 35 have a cursor 35*a* which makes it possible to choose between a positioning action on the object in the viewed image and a movement action of the object on the viewed image.

The user can just as well control the actions (of positioning or movement) on the entire object or only on a part. Thus the user can turn an object, orient it differently or exert a pressure on a certain zone of this object. This manipulation can be carried out just as well by means of a sensor as without the sensor. The user can for example directly use his/her fingers and in this way carry out any type of manipulation. He/she can also carry out these manipulations using a glove. During this manipulation, the user views the two images (real and virtual) superposed in the viewing space.

Using the sensors-actuators, in the manipulation space 15*b*, the user acts for example on the real image and on the virtual image. This action is transmitted in the real space 50 and virtual space 51 after processing by the computer 25. In effect, a first function of the computer carries out a time synchronisation between the images of the real space and those of the virtual space after the modifications carried out by the user on each object of each space. In each of these spaces there are found sensors-actuators 52, 53, 54 and 55 situated on either side of the real or virtual object. Each of these sensors-actuators is equipped with one processing unit 56. Thus the action transmitted in real space 50 is received by the processing unit 56 of the real sensors-actuators 52 and 53. These sensors-actuators can, for example, be articulated arms of robots or even jacks. In the same manner, the action transmitted in virtual space 51 is received by the processing unit 56 of the virtual sensors-actuators 54 and 55. The sensors-actuators 52, 53, 54 and 55 are not viewable because they operate solely in a digital manner.

Thus the real and virtual sensors-actuators will reproduce the movements induced by the user 1 via the sensors-actuators 35 localised in the manipulation space 15b behind the viewing device 2. As a consequence, the actions generated by the user as a result of the manipulation of the sensors-actuators in the manipulation space will be passed on to the object which is both real and virtual.

As a reaction to these actions, the real sensors-actuators 52 and 53 transmit force-feedback signals.

In our example, the force-feedback signal coming from the real sensor-actuator 52 is processed by the unit for processing the real actuators 56. Then the computer 25 receives this signal and processes it. In fact, a second function of the computer carries out a scaling between the images of real space and those of virtual space before the superposition of these two images in the viewing space 15a.

Then the images are transmitted to the processing unit 56 of the virtual sensor-actuator 52 as well as the processing unit 56 of the sensor-actuator 35 of the manipulation space.

The user can then experience the force-feedback in the viewing space 15a. The sensors-actuators make it possible to give back the sense of touch.

This type of operation also applies if, instead of considering a real object and a virtual object, two virtual objects are considered (this is a case of double virtual reality) or a single virtual object (this is a case of a stereoscopic screen) or a single real object (this is a case of autostereoscopic television)

What is claimed is:

1. A stereoscopic viewing system for manipulating an object by a user, said object being situated in a first space and a manipulation being provided in a second space which includes a manipulation space, said system being characterized in that it includes:
    a haptic system situated in the first and second space so that the user performs the manipulation in the second space which is translated into an equivalent manipulation on the physical object in the first space, wherein the manipulation of the object in the first space can be felt by the user in the second space; and
    an optical system for providing to the user an image of the equivalent manipulation in the first space, the image being formed in spatial coherence with the manipulation space in the second space, said image being obtained by a superposition of a right side image provided by a first video capture device and a left side image provided by a second video capture device, wherein the right side image is directly transmitted to the user's right eye and the left side image is directly transmitted to the user's left eye.

2. The viewing system according to claim 1, characterized in that the second space is a real physical space.

3. The viewing system according to claim 1, characterized in that the first space is made up of one or two spaces.

4. The viewing system according to claim 3, characterized in that the first space is made up of a real space.

5. The viewing system according to claim 3, characterized in that the first space is made up of a virtual space.

6. The viewing system according to claim 3, characterized in that the first space is made up of a real space and a virtual space.

7. The viewing system according to claim 3, characterized in that the first space is made up of two virtual spaces.

8. The viewing system according to claim 1, characterized in that the haptic system can reproduce the manipulation performed by the user in the second space in the first space.

9. The viewing system according claim 1, characterized in that the manipulation is performed in the manipulation space.

10. The viewing system according to claim 1, characterized in manipulation is absent from the image provided to the user.

11. The viewing system according to claim 1, characterized in that the manipulation is chosen from a list which includes sensors-actuators, the user's hands and the user.

12. The viewing system according to claim 1, characterized in that the optical system includes a number of optical elements in order to produce an image.

13. The viewing system according to claim 12, characterized in that the optical elements are chosen from a list which includes: a mirror-which reflection is between no reflection and total reflection, a filter, a screen, lenses.

14. The viewing system according to claim 13, characterized in that, when the mirror is a semi-reflecting mirror, only the second space is visible.

15. A method for stereoscopically viewing the manipulation of an object by a user, said object being situated in a first space and the manipulation being provided in a second space which includes a manipulation space, said method including the steps of:
    manipulating in the second space which is translated into an equivalent manipulation on the physical object in the first space by means of a haptic system situated in the first or the second space, wherein the manipulation of the object in the first space can be felt by the user in the second space; and
    producing an image of the equivalent manipulation in the first space to the user by means of an optical system, the image being formed in spatial coherence with the manipulation space in the second space, said image being obtained by a superposition of a right side image provided by a first video capture device and a left side image provided by a second video capture device, wherein the right side image is directly transmitted to the user's right eye and the left side image is directly transmitted to the user's left eye.

* * * * *